(12) United States Patent
Atsumi et al.

(10) Patent No.: US 11,371,353 B2
(45) Date of Patent: Jun. 28, 2022

(54) MANUFACTURING METHOD FOR TURBINE BLADE, AND TURBINE BLADE

(71) Applicant: MITSUBISHI HITACHI POWER SYSTEMS, LTD., Kanagawa (JP)

(72) Inventors: Hidekatsu Atsumi, Kanagawa (JP); Norihiko Motoyama, Kanagawa (JP); Shuji Tanigawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 8 days.

(21) Appl. No.: 16/647,060

(22) PCT Filed: Jun. 22, 2018

(86) PCT No.: PCT/JP2018/023775
§ 371 (c)(1),
(2) Date: Mar. 13, 2020

(87) PCT Pub. No.: WO2019/058680
PCT Pub. Date: Mar. 28, 2019

(65) Prior Publication Data
US 2020/0208525 A1    Jul. 2, 2020

(30) Foreign Application Priority Data

Sep. 19, 2017   (JP) .............................. JP2017-179331

(51) Int. Cl.
*F01D 5/14* (2006.01)
*F01D 25/12* (2006.01)
(Continued)

(52) U.S. Cl.
CPC .................. *F01D 5/14* (2013.01); *B22F 5/04* (2013.01); *B22F 7/064* (2013.01); *B33Y 10/00* (2014.12);
(Continued)

(58) Field of Classification Search
CPC . F01D 5/14; F01D 5/282; F01D 5/284; F01D 5/147; F01D 5/028; F01D 9/04;
(Continued)

(56) References Cited

U.S. PATENT DOCUMENTS

| 6,572,335 B2 | 6/2003 | Kuwabara et al. | |
| 7,217,088 B2* | 5/2007 | Albrecht | F01D 5/18 |
| | | | 415/115 |

(Continued)

FOREIGN PATENT DOCUMENTS

| JP | 08-284607 | 10/1996 |
| JP | 2001-254605 | 9/2001 |

(Continued)

OTHER PUBLICATIONS

Office Action dated Feb. 19, 2021 in corresponding Korean Patent Application No. 10-2020-7007467, with English Translation.
(Continued)

*Primary Examiner* — Eric J Zamora Alvarez
(74) *Attorney, Agent, or Firm* — Wenderoth, Lind & Ponack, L.L.P.

(57) ABSTRACT

A method of manufacturing a turbine blade includes forming a blade body divided body constituting a blade body of the turbine blade by a three-dimensional lamination method; individually forming a plurality of shroud divided bodies constituting a shroud of the turbine blade for each of the shroud divided bodies by a three-dimensional lamination method; joining the shroud divided bodies together; and joining the blade body divided body and the shroud divided bodies.

13 Claims, 11 Drawing Sheets

(51) Int. Cl.
*F01D 9/04* (2006.01)
*B22F 5/04* (2006.01)
*B22F 7/06* (2006.01)
*B22F 10/40* (2021.01)
*B23K 26/21* (2014.01)
*B23K 26/24* (2014.01)
*B23K 26/342* (2014.01)
*B23P 15/04* (2006.01)
*B33Y 10/00* (2015.01)
*B33Y 80/00* (2015.01)

(52) U.S. Cl.
CPC .............. *B33Y 80/00* (2014.12); *F01D 25/12* (2013.01); *F05D 2230/90* (2013.01); *F05D 2260/20* (2013.01)

(58) Field of Classification Search
CPC ...... F01D 25/12; F04D 29/388; F04D 29/322; F04D 29/324; F05D 2230/90; F05D 2300/603; F05D 2300/6033; F05D 2300/6034; F05D 2300/614; F05D 2300/702; F05D 2230/23; F05D 2230/232; F05D 2230/31; F05D 2240/11; F05D 2240/81; F05D 2240/80; F05D 2260/20; B29C 66/543; B29C 66/721; B29C 70/24; B33Y 10/00; B33Y 80/00; B22F 5/04; B22F 7/064
See application file for complete search history.

(56) References Cited

U.S. PATENT DOCUMENTS

| | | |
|---|---|---|
| 8,528,339 B2 * | 9/2013 | Morrison ................ F01D 5/147 60/753 |
| 2001/0021343 A1 | 9/2001 | Kuwabara et al. |
| 2007/0248780 A1 * | 10/2007 | Schober ................ B29C 70/543 428/57 |
| 2015/0086408 A1 | 3/2015 | Kottilingam et al. |
| 2019/0106990 A1 * | 4/2019 | Subramanian ........ C04B 37/021 |

FOREIGN PATENT DOCUMENTS

| | | |
|---|---|---|
| JP | 3782637 | 6/2006 |
| JP | 2015-67902 | 4/2015 |

OTHER PUBLICATIONS

International Search Report dated Sep. 4, 2018 in International (PCT) Application No. PCT/JP2018/023775.

* cited by examiner

MANUFACTURING METHOD FOR TURBINE BLADE, AND TURBINE BLADE

TECHNICAL FIELD

The present invention relates to a method of manufacturing a turbine blade, and a turbine blade.

BACKGROUND ART

A turbine which is used for a gas turbine, a steam turbine, or the like is configured such that a plurality of stationary blades and a plurality of rotor blades are alternately disposed along a flow direction of combustion gas or steam in a turbine casing. Each stationary blade is supported on a shroud which is mounted inside the turbine casing. Each rotor blade is supported on a rotor. In such a turbine, the combustion gas or the steam passes through the plurality of stationary blades and the plurality of rotor blades, whereby the rotor is driven and rotated (refer to, for example, Japanese Patent No. 3782637).

SUMMARY OF INVENTION

Technical Problem

A turbine blade which is used in the turbine described above is manufactured by casting. However, in recent years, manufacture of the turbine blade by a three-dimensional lamination method has been studied. There is a case where a turbine blade such as a stationary blade has, for example, a shape in which a shroud protrudes from a blade body. In a case where such a turbine blade is formed by a three-dimensional lamination method, when an inner shroud or an outer shroud is laminated on the blade body, many support materials are required in order to support a portion protruding from the blade body. For this reason, time and labor are required for a lamination step, and time and labor are also required for a post-treatment step of dissolving the support material.

The present invention has been made in view of the above, and has an object to provide a method of manufacturing a turbine blade in which it is possible to efficiently manufacture a turbine blade, and a turbine blade.

Solution to Problem

A method of manufacturing a turbine blade according to at least one embodiment of the present invention includes a blade body divided body formation step of forming a blade body divided body constituting a blade body of the turbine blade by a three-dimensional lamination method, a shroud divided body formation step of individually forming a plurality of shroud divided bodies constituting a shroud of the turbine blade for each of the shroud divided bodies by a three-dimensional lamination method, a shroud joining step of joining the shroud divided bodies together, and a blade body joining step of joining the blade body divided body and the shroud divided bodies.

Therefore, since the blade body divided body constituting the blade body and a plurality of shroud divided bodies obtained by dividing the shroud are formed separately for each divided body by a three-dimensional lamination method, the amount of the used support material can be greatly reduced compared to a case where the blade body and the shroud are formed together by a three-dimensional lamination method. For this reason, time and labor which are required for the lamination step can be reduced, and time and labor which are required for the post-treatment of the support material can also be reduced. In this way, the turbine blade can be manufactured more efficiently.

Further, in the shroud divided body formation step, the shroud divided body may be formed by performing lamination in a direction different from the direction in which the blade body divided body is laminated in the blade body divided body formation step.

Therefore, each of the blade body divided body and the shroud divided body can be formed by being laminated in an appropriate direction.

Further, an extension direction of the blade body and an extension direction of the shroud, which is a direction having an angle with respect to the extension direction of the blade body, are set in the turbine blade, in the blade body divided body formation step, the blade body divided body is formed by performing lamination along the extension direction of the blade body, and in the shroud divided body formation step, the shroud divided body is formed by performing lamination along the extension direction of the shroud.

Therefore, the blade body divided body can be laminated along the extension direction of the blade body, and the shroud divided body can be laminated along the extension direction of the shroud. In this way, a lamination area is small, and therefore, the lamination can be performed in a narrow work space.

Further, the shroud divided body formation step may include, when a cooling flow path of which a cross-sectional shape is a shape having a long-side direction and a short-side direction is formed in the interior of at least one shroud divided body among the plurality of shroud divided bodies, forming the shroud divided body by performing lamination in the long-side direction of the cross-sectional shape of the cooling flow path.

Therefore, the shroud divided body is formed by performing lamination in the long-side direction of the cross-sectional shapes of the cooling flow path, whereby the use of the support material can be suppressed, and therefore, the turbine blade can be manufactured more efficiently.

Further, the shroud divided body formation step may include forming the shroud divided body in such a size that a cooling flow path unit which is constituted by continuous cooling flow paths does not straddle a joined portion between the shroud divided bodies.

Therefore, since the degree of freedom in a case of designing the cooling flow path increases, it is possible to efficiently manufacture a shroud having a more optimal cooling flow path.

Further, in the shroud divided body formation step, the shroud divided body may be formed such that a joined portion between the shroud divided bodies is provided at a position where a distance between the blade body and an end surface in an extension direction of the shroud is reduced.

Therefore, with respect to the joined portions joining the shroud divided bodies, the distance can be kept small.

Further, a fillet portion of the blade body may be provided in the blade body divided body, and the blade body joining step may include joining the blade body divided body and the shroud divided body at a position avoiding the fillet portion.

Therefore, it is possible to efficiently manufacture the turbine blade while maintaining the quality thereof.

Further, the shroud joining step and the blade body joining step may include welding the divided bodies to each other by a laser powder overlay welding method.

In this way, a configuration is made in which strength in the welded portion is excellent. Further, since the laser powder overlay welding method is a low heat input welding, and therefore, deformation due to welding can be suppressed.

When performing welding by the laser powder overlay welding method, the welding may be performed using powder of the same material as a blade body constituent material constituting the blade body and a shroud constituent material constituting the shroud.

Therefore, since the blade body and the shroud, and the welded portion are formed of the same material, a configuration is made in which strength in the welded portion is excellent.

Further, the shroud may have a gas path surface facing the blade body side, and the blade body joining step may include providing a joining groove on the gas path surface side and welding the blade body divided body and the shroud divided body.

Therefore, since it is possible to avoid a back wave of the welded portion being formed on the gas path surface side of the shroud, a decrease in quality can be suppressed.

Further, the blade body divided body formation step may include forming a positioning portion at the blade body divided body by a three-dimensional lamination method, and the blade body joining step may include fixing the positioning portion of the blade body divided body to a first jig and fixing the shroud divided body to a second jig, aligning the blade body divided body fixed to the first jig with the shroud divided body fixed to the second jig, and joining the blade body divided body and the shroud divided body aligned.

Therefore, by forming the positioning portion at the blade body, the first jig can be easily mounted to the blade body. Further, by fixing and joining the blade body and the shroud by using the first jig and the second jig, misalignment when performing joining can be suppressed, and the turbine blade can be efficiently manufactured with high accuracy.

A turbine blade according to at least one embodiment of the present invention includes a blade body in which blade body constituent materials are laminated, and a shroud joined to the blade body, in which in the shroud, a plurality of shroud divided bodies in a state where shroud constituent materials are laminated are joined together.

Therefore, it is possible to provide the turbine blade in which manufacturing efficiency is high and a reduction in cost is possible.

A turbine blade according to at least one embodiment of the present invention includes a blade body in which blade body constituent materials are laminated, and a shroud formed separately from the blade body and joined to the blade body, in which a lamination direction in a three-dimensional lamination method is different between the blade body and the shroud.

Therefore, each of the blade body divided body and the shroud divided body can be formed by being laminated in an appropriate direction.

Further, an extension direction of the blade body and an extension direction of the shroud, which is a direction having an angle with respect to the extension direction of the blade body, are set in the turbine blade, a lamination direction of the blade body may be a direction along the extension direction of the blade body, and a lamination direction of the shroud may be a direction along the extension direction of the shroud.

Therefore, the blade body divided body can be laminated along the extension direction of the blade body, and the shroud divided body can be laminated along the extension direction of the shroud.

Further, the shroud has, in the interior thereof, a cooling flow path of which a cross-sectional shape is a shape having a long-side direction and a short-side direction, and a lamination direction of the shroud may be a direction along the long-side direction of the cross-sectional shape of the cooling flow path.

Therefore, the shroud divided body can be formed by performing lamination in the long-side direction of the cross-sectional shape of the cooling flow path. In this way, since the use of the support material can be suppressed, the turbine blade can be manufactured more efficiently and at low cost.

Advantageous Effects of Invention

According to at least one embodiment of the present invention, it is possible to efficiently manufacture a turbine blade.

DESCRIPTION OF EMBODIMENTS

Hereinafter, an embodiment of a method of manufacturing a turbine blade and a turbine blade according to the present invention will be described based on the drawings. The present invention is not limited to this embodiments. Further, the constituent elements in the following embodiment include those that can be easily replaced by those skilled in the art or those that are substantially equal to them.

Figure 1:
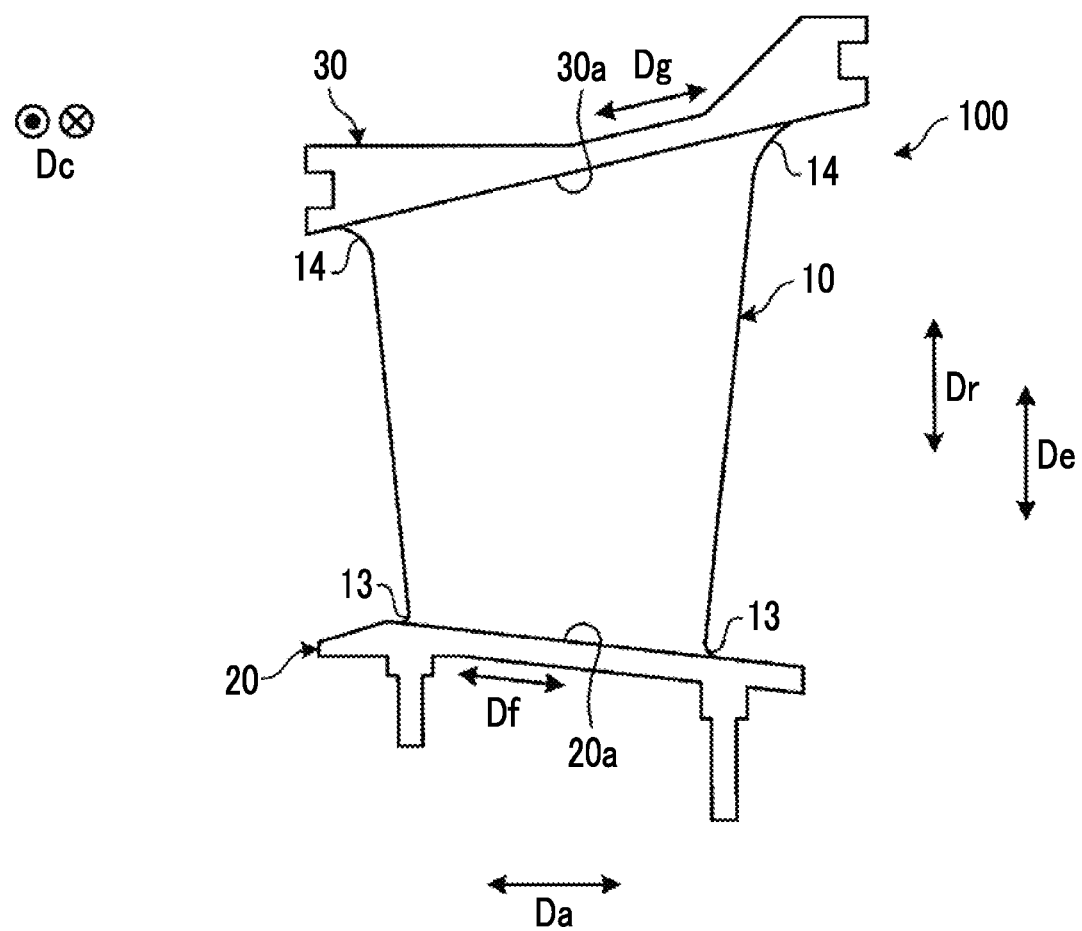
FIG. 1 is a diagram showing an example of a turbine blade according to the present embodiment.

FIG. 1 is a diagram showing an example of a turbine blade 100 according to this embodiment. The turbine blade 100 shown in FIG. 1 is, for example, a stationary blade of a turbine which is used in a gas turbine, a steam turbine, or the like. However, there is no limitation thereto. As shown in FIG. 1, the turbine blade 100 includes a blade body 10, and an inner shroud 20 and an outer shroud 30 as shrouds.

The blade body 10 has, for example, a hollow shape. In the blade body 10, a front end portion on the upstream side (in FIG. 1, the left side) in a flow direction (an axial direction Da) of combustion gas in a state of being disposed in a turbine has a curved cross-sectional shape, and a rear end portion on the downstream side (in FIG. 1, the right side) in the axial direction Da has a tapered cross-sectional shape. Further, in the blade body 10, a pressure-side portion on one side (the front side in the plane of FIG. 1) in a direction (a circumferential direction Dc) intersecting the flow direction of the combustion gas in a state of being disposed in the turbine has a convexly curved cross-sectional shape, and a suction-side portion on the other side (the back side in the plane of FIG. 1) in the circumferential direction Dc has a concavely curved cross-sectional shape.

Further, the interior of the blade body 10 is partitioned into a plurality of cavities by partition walls. Although not shown, the blade body 10 has a plurality of cooling holes formed to penetrate the inside and the outside at predetermined positions corresponding to the respective cavities. Further, in the blade body 10, a porous plate is disposed inside each cavity, and after the blade body 10 is impingement-cooled by cooling air supplied to each cavity, the blade body 10 is film-cooled by ejecting the cooling air from each cooling hole to the outside.

The blade body 10 is formed in a state where blade body constituent materials are laminated in one direction, for example, a radial direction Dr. Therefore, the blade body 10 extends along the radial direction Dr. That is, an extension direction De of the blade body 10 coincides with the radial direction Dr. In the blade body 10, an end portion on one side (in FIG. 1, the lower side) in a lamination direction (the radial direction Dr) is fixed to the inner shroud 20, and an end portion on the other side (in FIG. 1, the upper side) is fixed to the outer shroud 30. The blade body 10 has fillet portions 13 and 14 curved over both ends in the radial direction Dr. The fillet portion 13 is provided on the inner shroud 20 side in the radial direction Dr. The fillet portion 14 is provided on the outer shroud 30 side in the radial direction Dr.

Each of the inner shroud 20 and the outer shroud 30 functions as a gas path surface forming member. That is, the inner shroud 20 has a gas path surface 20a on the blade body 10 side. Further, the outer shroud 30 has a gas path surface 30a on the blade body 10 side. The gas path surfaces 20a and 30a are surfaces with which the combustion gas comes into contact in a case of being disposed in the turbine. The inner shroud 20 extends in a direction along the gas path surface 20a. Hereinafter, the direction along the gas path surface 20a is referred to as an extension direction Df of the inner shroud 20. That is, the extension direction Df of the inner shroud 20 is a direction having an angle with respect to the extension direction De of the blade body 10 and is a direction which includes the axial direction Da, the circumferential direction Dc, and a direction having a component in the axial direction Da and a component in the circumferential direction Dc. The outer shroud 30 extends in a direction along the gas path surface 30a. Hereinafter, the direction along the gas path surface 30a is referred to as an extension direction Dg of the outer shroud 30. That is, the extension direction Dg of the outer shroud 30 is a direction having an angle with respect to the extension direction De of the blade body 10 and is a direction which includes the axial direction Da, the circumferential direction Dc, and a direction having a component in the axial direction Da and a component in the circumferential direction Dc. However, the extension directions of the outer shroud and the inner shroud are not limited to the directions defined by the symbols Df and Dg and may be any directions as long as they are directions along the gas path surfaces 20a and 30a. Further, hereinafter, the outer shroud 30 will be described as an example of the shroud. However, the inner shroud 20 can also be similarly described.

Figure 2:
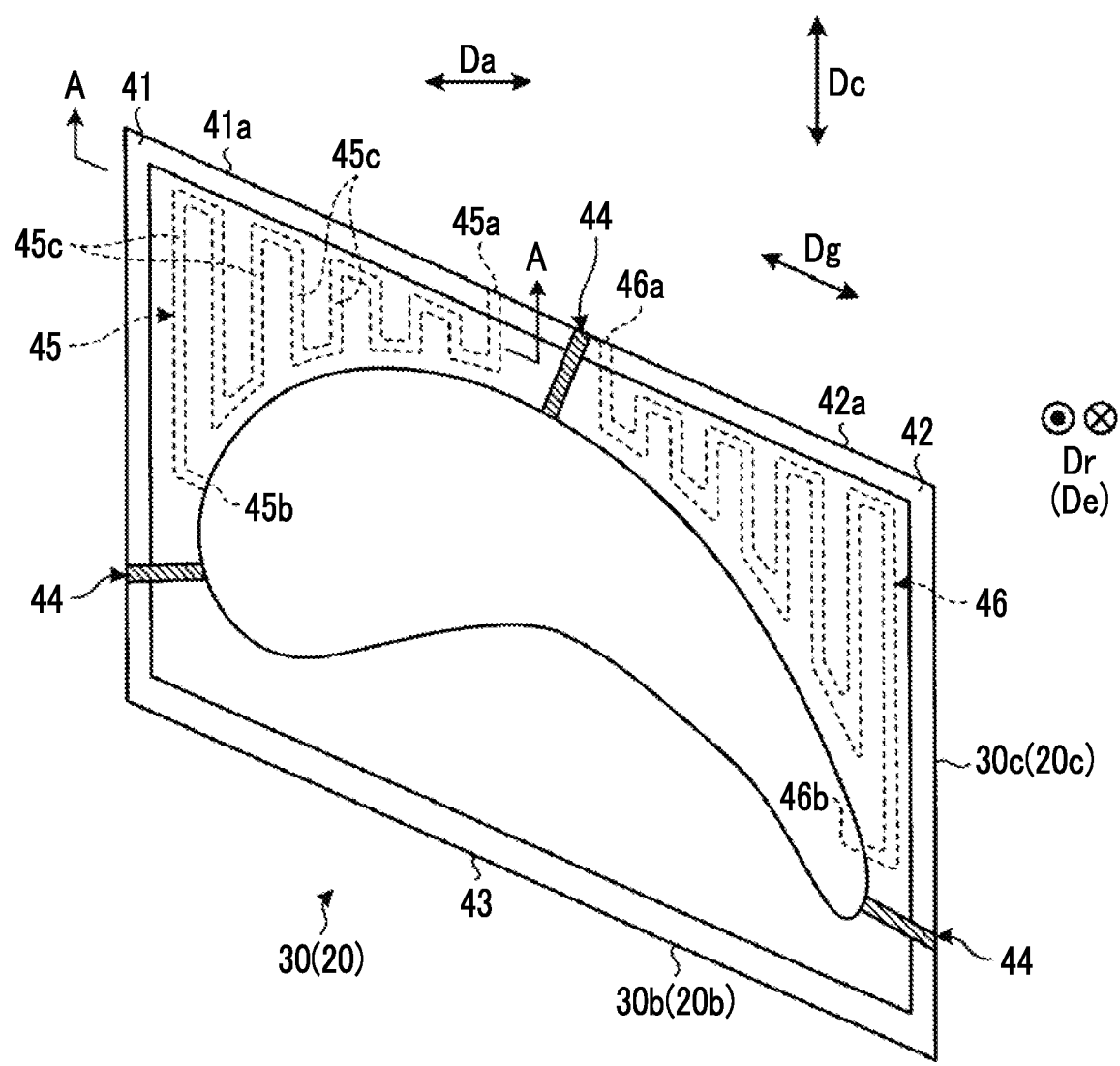
FIG. 2 is a diagram showing an example of an inner shroud and an outer shroud.

FIG. 2 is a diagram showing an example of the outer shroud 30. As shown in FIG. 2, the outer shroud 30 has a configuration in which a plurality of shroud divided bodies 41, 42, and 43 are joined together at joined portions 44. The joined portion 44 is a welded portion by, for example, a laser powder overlay welding method. Each of the shroud divided bodies 41, 42, and 43 is formed in a state where shroud constituent materials are laminated in one direction. A lamination direction of the shroud constituent materials may be a direction different for each of the shroud divided bodies 41, 42, and 43 in one outer shroud 30, for example. Further, a method of laminating the shroud constituent materials may be a lamination method different for each of the shroud divided bodies 41, 42, and 43 in one outer shroud 30, for example.

The shroud divided body 41 has, in the interior thereof, a cooling flow path 45 through which cooling air flows. The shroud divided body 42 has, in the interior thereof, a cooling flow path 46 through which cooling air flows. Each of the cooling flow paths 45 and 46 configures, for example, a part of a cooling flow path for supplying cooling air from the interior of the blade body 10 to an end surface 30b (or an end surface 30c) of the outer shroud 30. Each of the cooling flow paths 45 and 46 is formed as an independent flow path. A cooling flow path may be provided in the shroud divided body 43.

The cooling flow path 45 has an outer periphery side opening portion 45a and an inner periphery side opening portion 45b. The cooling flow path 45 is disposed to meander in the shroud divided body 41, for example. Specifically, the cooling flow path 45 has a plurality of flow path portions 45c extending in one direction (for example, an up-down direction in FIG. 2) in the shroud divided body 41, and end portions in one direction of the flow path portions 45c are connected to each other. The disposition of the cooling flow path 45 is not limited to the disposition described above, and another disposition may be adopted. Further, each of the outer periphery side opening portion 45a and the inner periphery side opening portion 45b may be one or may be plural. The outer periphery side opening portion 45a is provided on an end surface 41a of the shroud divided body 41.

Figure 3:
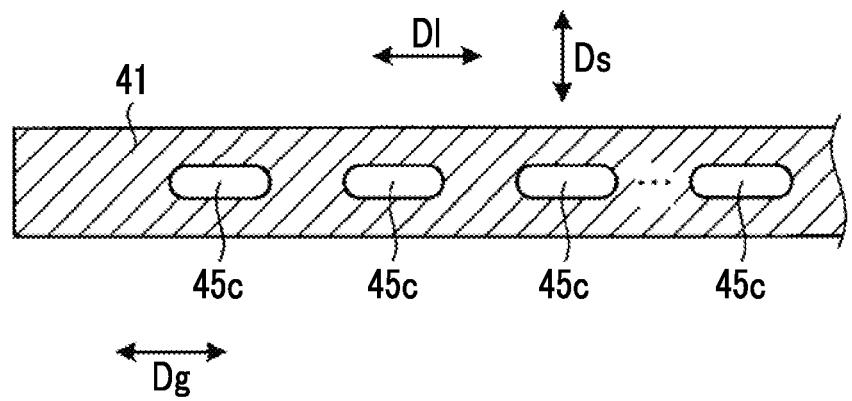
FIG. 3 is a diagram showing a configuration along an A-A line cross section in FIG. 2.

FIG. 3 is a diagram showing a configuration along an A-A line cross section in FIG. 2. As shown in FIG. 3, in the cooling flow path 45, the cross-sectional shape of the flow path portion 45c is an elongated hole shape. In this embodiment, a long-side direction of the cross-sectional shape of the flow path portion 45c is, for example, a direction parallel to the axial direction Da (refer to FIG. 1). However, it is not limited thereto. The shape of each of the outer periphery side opening portion 45a and the inner periphery side opening portion 45b is also an elongated hole shape (refer to FIG. 4) similar to the cross-sectional shape of the flow path portion 45c.

Similarly, the cooling flow path 46 has an outer periphery side opening portion 46a and an inner periphery side opening portion 46b. The cooling flow path 46 is disposed to meander in the shroud divided body 42, for example. Specifically, the cooling flow path 46 has a plurality of flow path portions 46c extending in one direction (for example, a vertical direction in FIG. 2) in the shroud divided body 42, and end portions in one direction of these flow path portions 46c are connected to each other, whereby the cooling flow path 46 is disposed to meander. The disposition of the cooling flow path 46 is not limited to the disposition described above, and another disposition may be adopted. Further, also with respect to the cooling flow path 46, similar to the cooling flow path 45, the cross-sectional shape of the flow path portion 46c is an elongated hole shape. Further, a direction in which the flow path portion 46c extends may be a direction different from the direction in which the flow path portion 45c of the cooling flow path 45 extends. Further, each of the outer periphery side opening portion 46a and the inner periphery side opening portion 46b may be one or may be plural. The outer periphery side opening portion 46a is provided on an end surface 42a of the shroud divided body 42.

Figure 4:
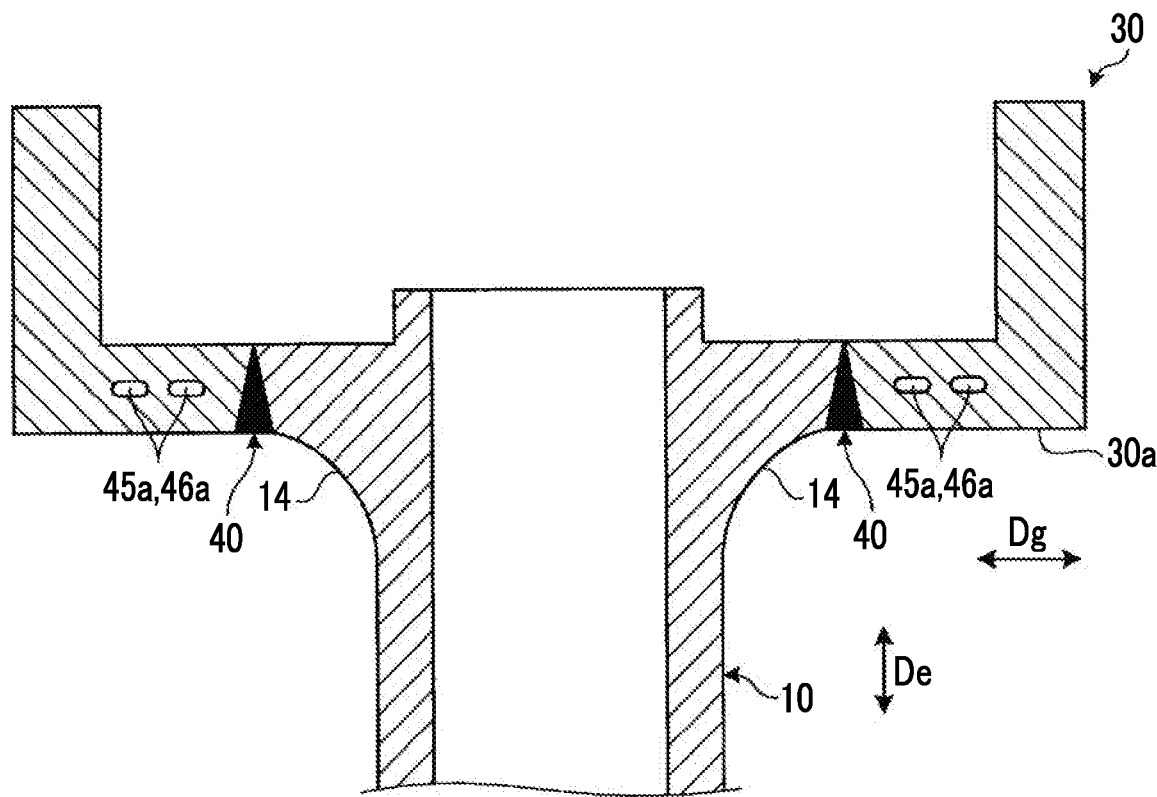
FIG. 4 is a diagram showing an example of a joined portion between a blade body and a shroud.

FIG. 4 is a diagram showing an example of a joined portion between the blade body 10 and the outer shroud 30. As shown in FIG. 4, the blade body 10 and the outer shroud 30 are joined to each other by a joined portion 40. The joined portion 40 is a welded portion formed by, for example, a laser powder overlay welding method. The joined portion 40 is formed at a position avoiding the fillet portion 14 of the blade body 10. For example, the joined portion 40 is formed at a position outside the fillet portion 14 in the blade body 10. In the joined portion 40, the blade body 10 and the outer shroud 30 are joined to each other in a state where the respective joining grooves are provided on the gas path surface 30a. The joined portion 40 is in a state of being flush with the gas path surface 30a.

Figure 5:
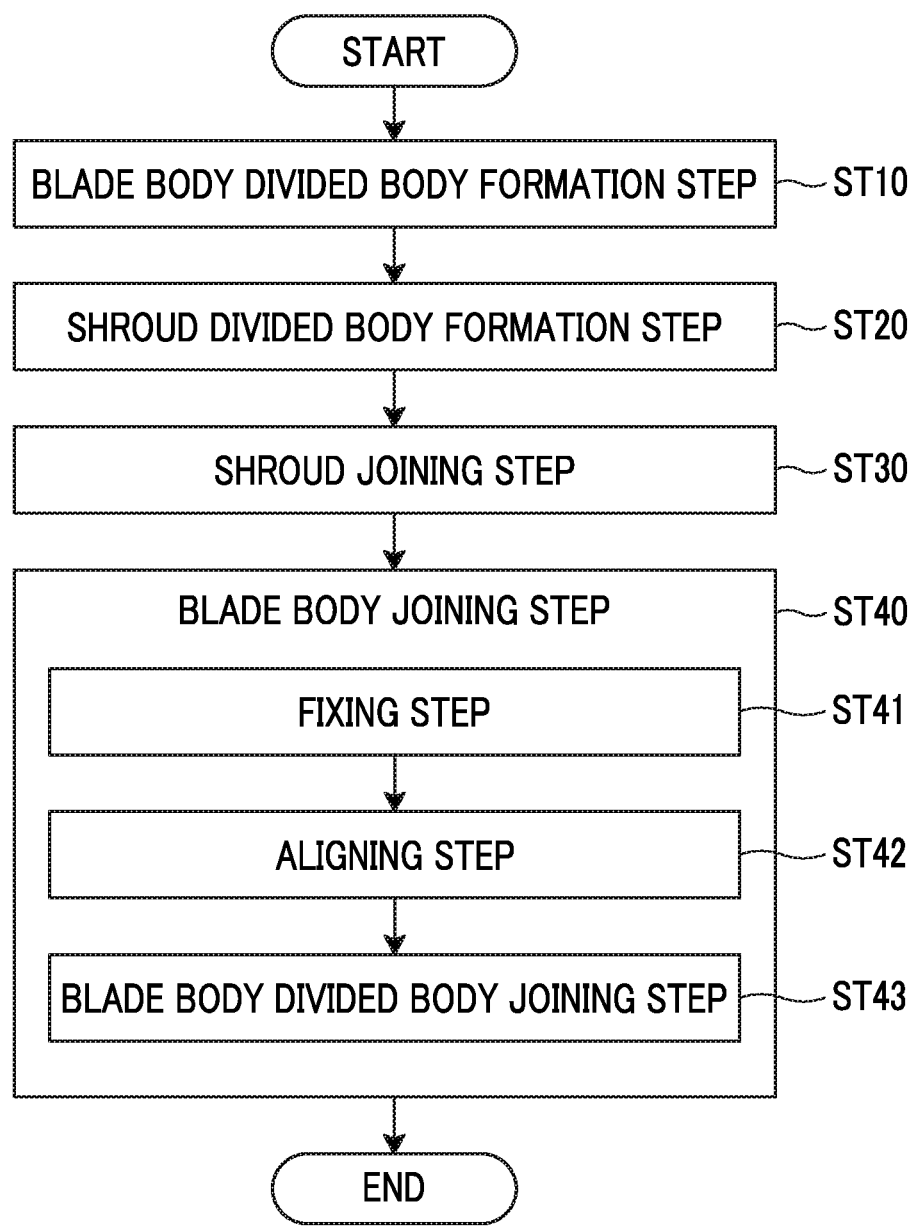
FIG. 5 is a flowchart showing a method of manufacturing a turbine blade according to the present embodiment.

FIG. 5 is a flowchart showing a method of manufacturing the turbine blade 100 according to this embodiment. As shown in FIG. 5, the method of manufacturing a turbine blade includes a blade body divided body formation step ST10, a shroud divided body formation step ST20, a shroud joining step ST30, and a blade body joining step ST40.

Figure 7:
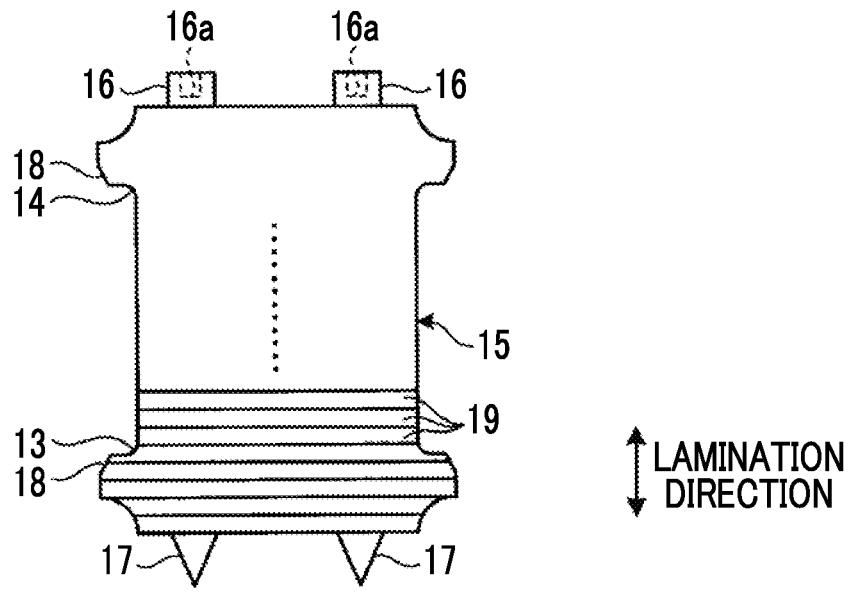
FIG. 7 is a diagram showing an example of a blade body which is formed by a three-dimensional lamination method.

In the blade body divided body formation step ST10, the blade body divided body constituting the blade body 10 is formed by a three-dimensional lamination method. Further, in the blade body divided body formation step ST10, a blade body divided body 15 which is a divided body constituting the blade body 10 is also formed by a three-dimensional lamination method. FIG. 7 is a diagram showing an example of the blade body divided body 15 which is formed by a three-dimensional lamination method. As shown in FIG. 7, the blade body divided body 15 is formed to have a shape which includes positioning portions 16 and 17. The positioning portions 16 and 17 are portions which perform positioning between the blade body divided body 15 and a first jig 50 (refer to FIG. 10 and the like) to be described later, and are mounted to the first jig 50. The positioning portion 16 has a recessed portion 16a. Further, the positioning portion 17 is a weight-shaped protrusion portion. The shapes of the positioning portions 16 and 17 are not limited to these and may be different from the shapes described above.

The blade body divided body 15 is formed by laminating blade body constituent materials 19 in a direction along the extension direction De of the blade body 10 by a three-dimensional lamination method. In this case, the blade body constituent materials 19 may be laminated from the inner shroud 20 side to the outer shroud 30 side, and conversely, the blade body constituent materials 19 may be laminated from the outer shroud 30 side to the inner shroud 20 side. Further, in this embodiment, the blade body divided body 15 is joined to the inner shroud 20 outside the fillet portion 13 in the extension direction Df of the inner shroud 20. Further, the blade body divided body 15 is joined to the outer shroud 30 outside the fillet portion 14 in the extension direction Dg of the outer shroud 30. For this reason, when the blade body divided body 15 is formed, it is formed so as to include at least the fillet portions 13 and 14. Further, joining grooves 18 are formed at the joined portions to the inner shroud 20 and the outer shroud 30. The joining grooves 18 are formed on the sides corresponding to the gas path surfaces 20a and 30a of the inner shroud 20 and the outer shroud 30. The blade body 10 and the shroud divided bodies 41, 42, and 43 are formed, whereby the blade body divided body formation step ST10 is completed.

Next, in the shroud divided body formation step ST20, a plurality of shroud divided bodies 41, 42, and 43 obtained by dividing at least one of the inner shroud 20 and the outer shroud 30 are individually formed for each of the shroud divided bodies 41, 42, and 43 by a three-dimensional lamination method.

In the shroud divided body formation step ST20, first, the shapes of the shroud divided bodies 41, 42, and 43 are designed. In this case, for example, design of the disposition, shapes, and the like of the cooling flow paths 45 and 46 is performed in advance. Then, the shapes of the shroud divided bodies 41, 42, and 43 are designed in accordance with the disposition and shapes of the designed cooling flow paths 45 and 46. In this manner, the cooling flow paths 45 and 46 are preferentially designed, and the shapes of the shroud divided bodies 41, 42, and 43 can be matched to the design, so that the degree of freedom in a case of designing the cooling flow paths 45 and 46 is increased. For this reason, the inner shroud 20 and the outer shroud 30 having the more optimal cooling flow paths 45 and 46 can be manufactured easily. Further, the shapes of the shroud divided bodies 41, 42, and 43 are designed such that the dimension of the joined portion 44 when joining the shroud divided bodies 41, 42, and 43 together is reduced. For example, the shroud divided bodies 41, 42, and 43 are designed such that the joined portion 44 is provided at a position where the distance between a leading edge-side curved surface portion, a trailing edge-side curved surface portion, or a suction-side curved surface portion of the blade body 10 and each of the end surfaces 30b and 30c in the extension direction Dg of the outer shroud 30 is reduced.

Figure 6:
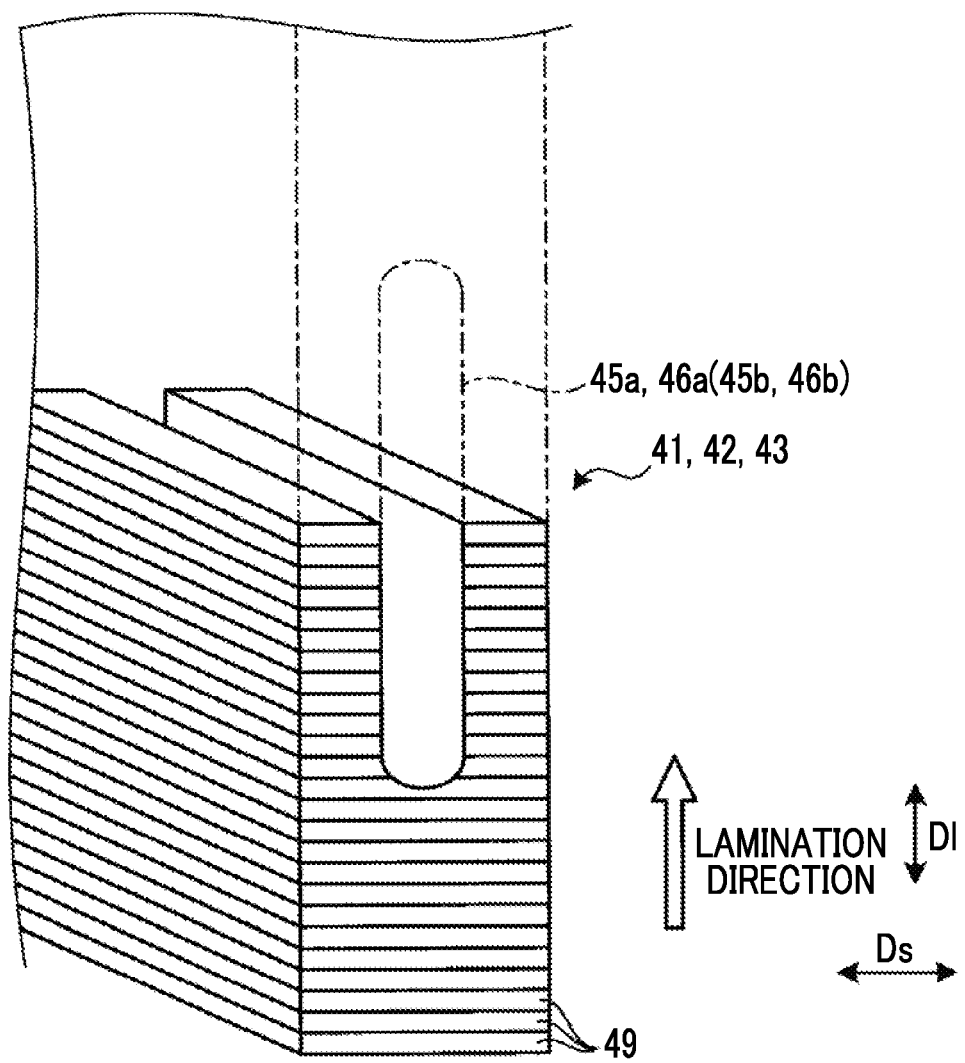
FIG. 6 is a diagram showing an aspect in which shroud constituent materials are laminated.

After the shapes of the shroud divided bodies 41, 42, and 43 are designed, the shroud divided bodies 41, 42, and 43 are formed by laminating shroud constituent materials by a three-dimensional lamination method. FIG. 6 is a diagram showing an aspect in which the shroud constituent materials are laminated. As shown in FIG. 6, in this embodiment, the shroud divided bodies 41, 42, and 43 are formed by laminating shroud constituent materials 49 in a long-side direction D1 of the outer periphery side opening portions 45a and 46a and the inner periphery side opening portions 45b and 46b. In this embodiment, as the long-side direction D1, it is possible to set an optimum direction among a direction vertical to a short-side direction Ds of the outer periphery side opening portions 45a and 46a and the inner periphery side opening portions 45b and 46b, a direction along the extension directions Df and Dg of the shrouds, a direction along the extension direction of the flow path portions 45c and 46c, a direction along the direction vertical to the extension direction of the flow path portions 45c and 46c, a direction along the radial direction Dr of the turbine, the circumferential direction Dc of the turbine, and a direction including the radial direction Dr component and the circumferential direction Dc component of the turbine. Each of the directions described above includes a tolerance. In this way, the use of a support material can be suppressed compared to a case where the shroud constituent materials 49 are laminated in the short-side direction of the outer periphery side opening portions 45a and 46a or the like of the cooling flow paths 45 and 46, and therefore, the turbine blade can be manufactured more efficiently. Further, as a result, in the shroud divided body formation step ST20, each of the shroud divided bodies 41, 42, and 43 is formed by laminating the shroud constituent materials in a direction different from the direction in which the blade body divided body 15 is laminated. A joining groove 48 (refer to FIGS. 10, 11, and the like) is formed at a joined portion of each of the shroud divided bodies 41, 42, and 43 to the blade body 10. The joining groove 48 is formed on the side of the gas path surfaces 20a and 30a of the inner shroud 20 and the outer shroud 30.

Figure 8:
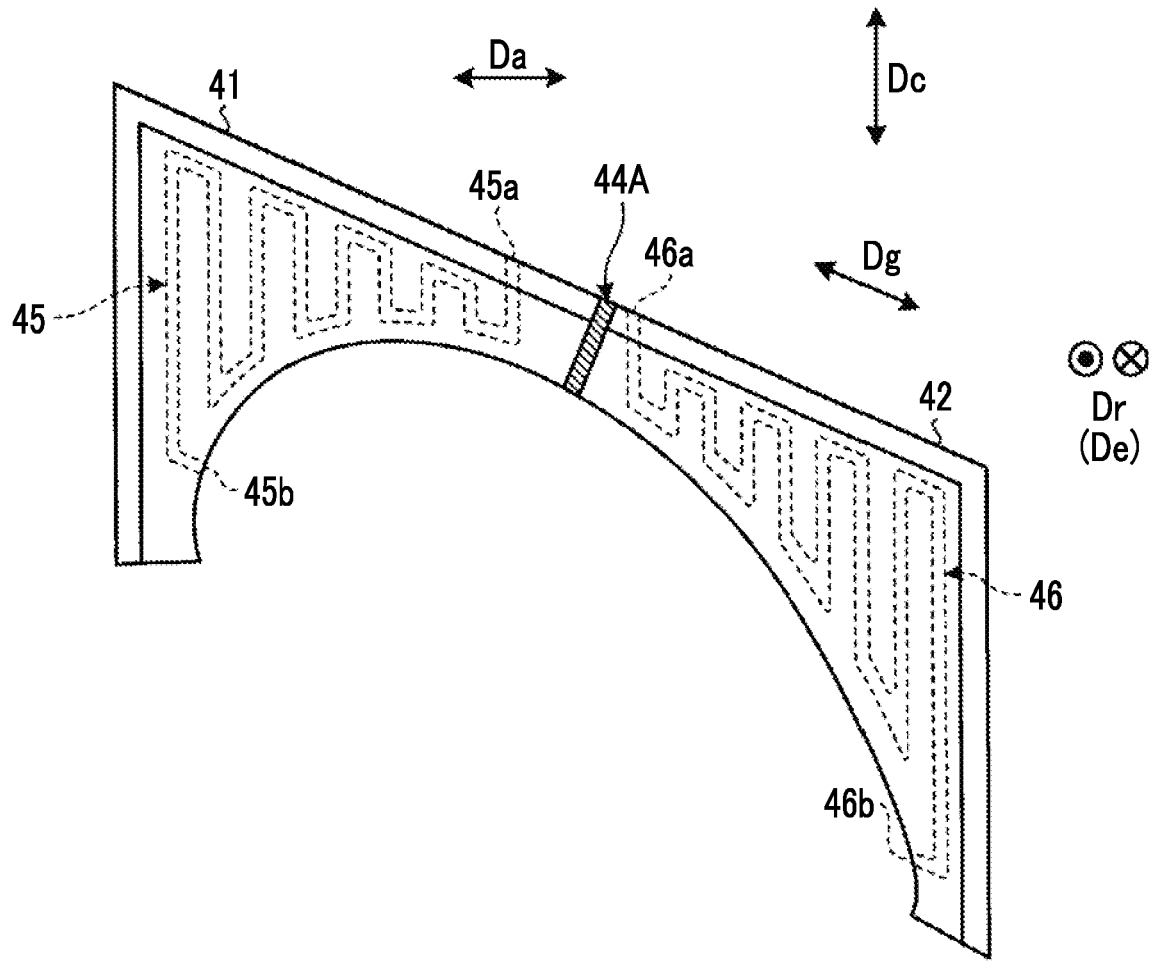
FIG. 8 is a diagram showing an example in a case of joining shroud divided bodies.
Figure 9:
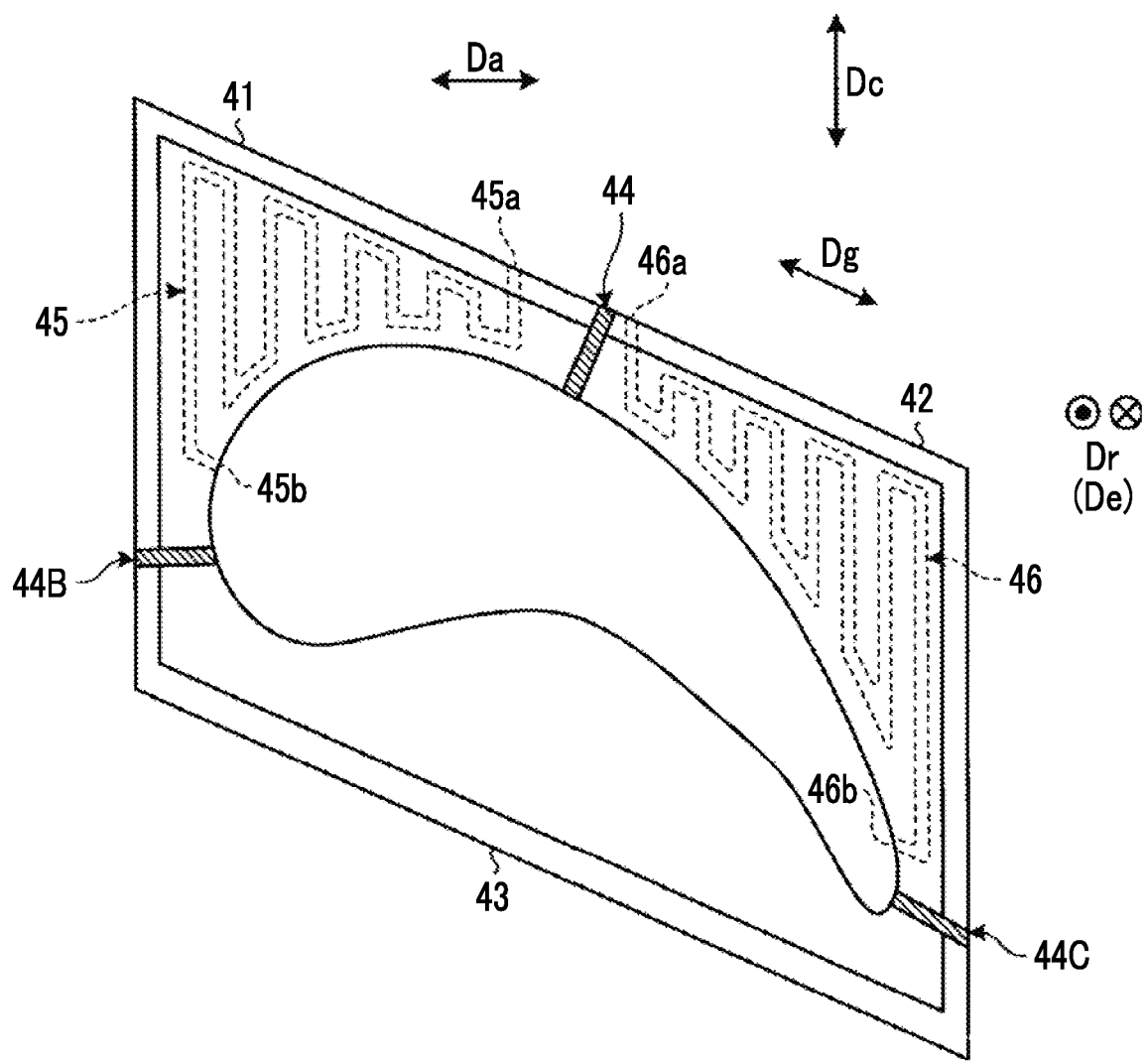
FIG. 9 is a diagram showing an example in a case of joining the shroud divided bodies.

In the shroud joining step ST30, the shroud divided bodies 41, 42, and 43 are joined together. FIGS. 8 and 9 are diagrams showing an example of the shroud joining step ST30. As shown in FIG. 8, in the shroud joining step ST30, first, two shroud divided bodies among the three shroud divided bodies 41, 42, and 43 are selected, and the two shroud divided bodies are joined together. For example, in FIG. 8, the shroud divided body 41 having the cooling flow path 45 and the shroud divided body 42 having the cooling flow path 46 are selected. However, the shroud divided body 43 may be selected as any one of them.

In a case of performing joining, first, the shroud divided body 41 and the shroud divided body 42 are aligned with each other to obtain a state where their joined portions are aligned with each other. In this state, a joined portion 44A between the shroud divided body 41 and the shroud divided body 42 is welded by, for example, a laser powder overlay welding method. By performing welding by the laser powder overlay welding method, the shroud divided body 41 and the shroud divided body 42 can be efficiently and firmly welded to each other.

After the shroud divided body 41 and the shroud divided body 42 are joined together, as shown in FIG. 9, the shroud divided body 43 is joined to the joined body of the shroud divided bodies 41 and 42. In this case, the joining of the shroud divided body 43 is performed at two joined portions 44B and 44C; a joined portion (joint portion 44B) between the shroud divided body 43 and the shroud divided body 41 and a joined portion (joint portion 44C) between the shroud divided body 43 and the shroud divided body 42. As the order of the joining, any one of the joined portions 44B and 44C may be joined first, or the joined portions 44B and 44C may be joined at the same time. The shroud divided body 43 is joined to each of the shroud divided bodies 41 and 42, whereby a joined body 25 of the inner shroud 20 and a joined body 35 of the outer shroud 30 are formed.

In the blade body joining step ST40, the blade body divided body 15 is joined to the joined bodies 25 and 35. The blade body joining step ST40 includes a fixing step ST41 of fixing the positioning portions 16 and 17 of the blade body divided body 15 to the first jig 50 and fixing the joined bodies 25 and 35 to a second jig 60, a aligning step ST42 of aligning the blade body divided body 15 fixed to the first jig 50 with the joined bodies 25 and 35 fixed to the second jig 60, and a blade body divided body joining step ST43 of joining the blade body divided body 15 and the joined bodies 25 and 35 aligned.

Figure 10:
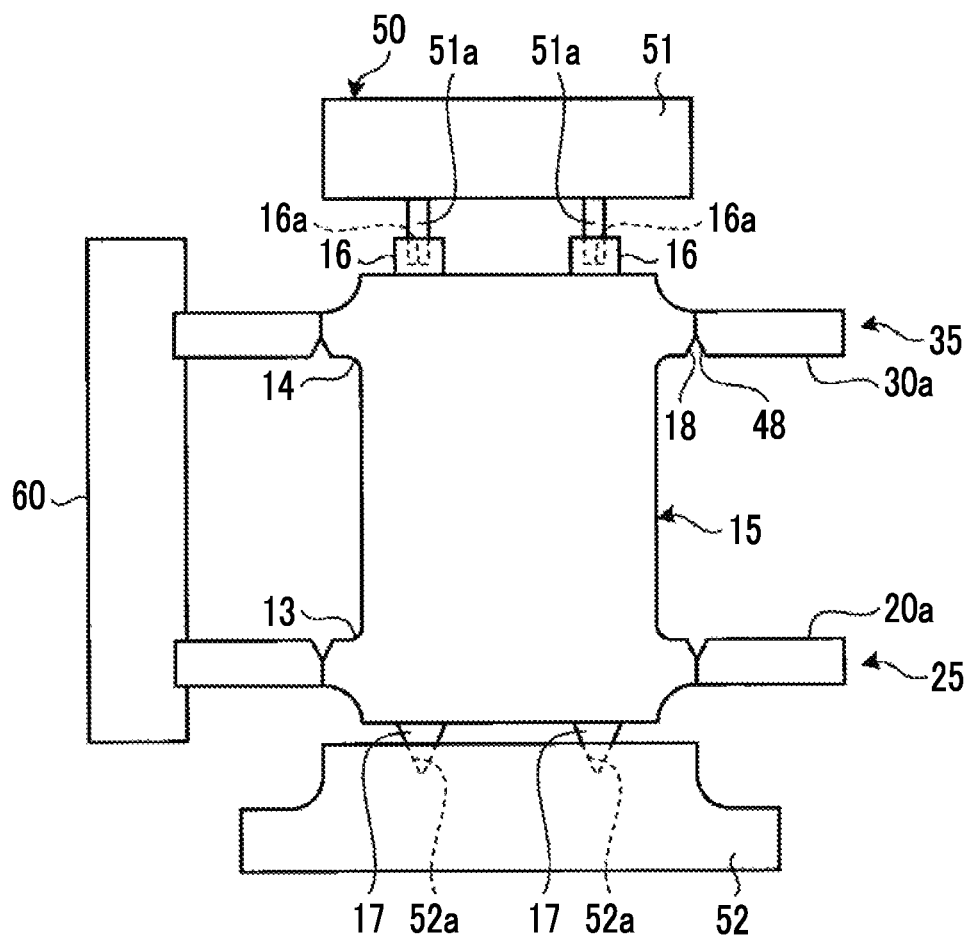
FIG. 10 is a process diagram showing a state where the blade body is joined to the inner shroud and the outer shroud.

FIG. 10 is a diagram showing an example of a state where the fixing step ST41 and the aligning step ST42 are performed. As shown in FIG. 10, in the fixing step ST41, a protrusion portion 51a of a support member 51 of the first jig 50 is inserted into the recessed portion 16a of the positioning portion 16 of the blade body divided body 15. Further, the positioning portion 17 of the blade body divided body 15 is inserted into an insertion hole 52a of the support member 52 of the first jig 50. Further, the joined bodies 25 and 35 are fixed to the second jig 60. Then, in the aligning step ST42, alignment between the blade body divided body 15 fixed to the first jig 50 and the joined bodies 25 and 35 fixed to the second jig 60 is performed.

Figure 11:
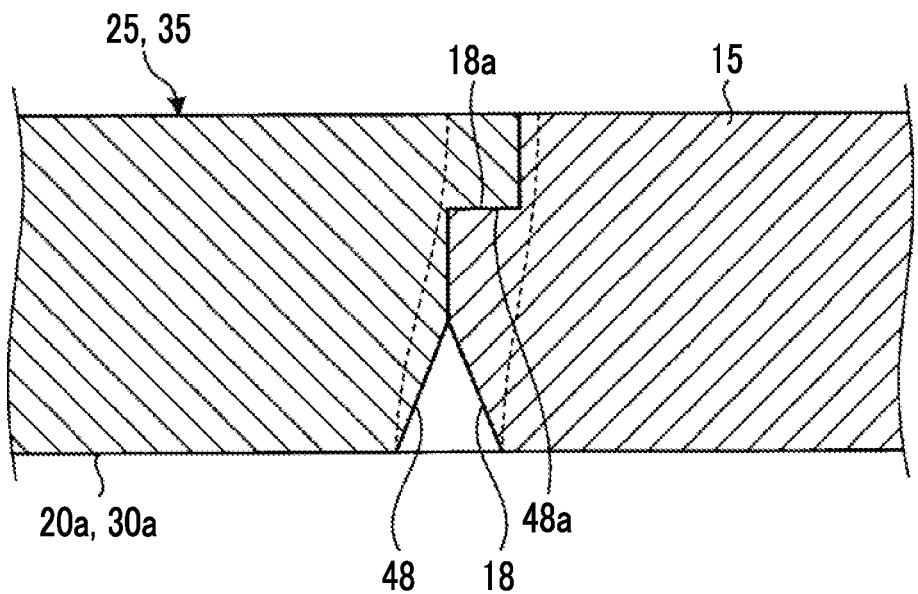
FIG. 11 is a process diagram showing a state where the blade body is joined to the inner shroud and the outer shroud.

FIG. 11 is a diagram showing a state in which the blade body divided body 15 and the joined bodies 25 and 35 are aligned with each other. As shown in FIG. 11, the blade body divided body 15 is provided with the joining groove 18 on the surface which comes into contact with each of the joined bodies 25 and 35. Further, each of the joined bodies 25 and 35 is provided with the joining groove 48 on the surface which comes into contact with the blade body divided body 15. The joining grooves 18 and 48 are provided on the gas path surfaces 20a and 30a of the inner shroud 20 and the outer shroud 30, respectively. In this way, it is possible to avoid a back wave of the portion which is joined being formed on the side of the gas path surfaces 20a and 30a, and therefore, it is possible to suppress a decrease in quality. Further, as shown in FIG. 11, for example, hook portions 18a and 48a may be provided on the contact surfaces where the blade body divided body 15 and the joined bodies 25 and 35 come into contact with each other. In this case, the blade body divided body 15 and the joined bodies 25 and 35 are joined to each other in a state of being in contact with each other through the hook portions 18a and 48a, and therefore, stronger joining becomes possible. The hook portions 18a and 48a may not be provided.

Figure 12:
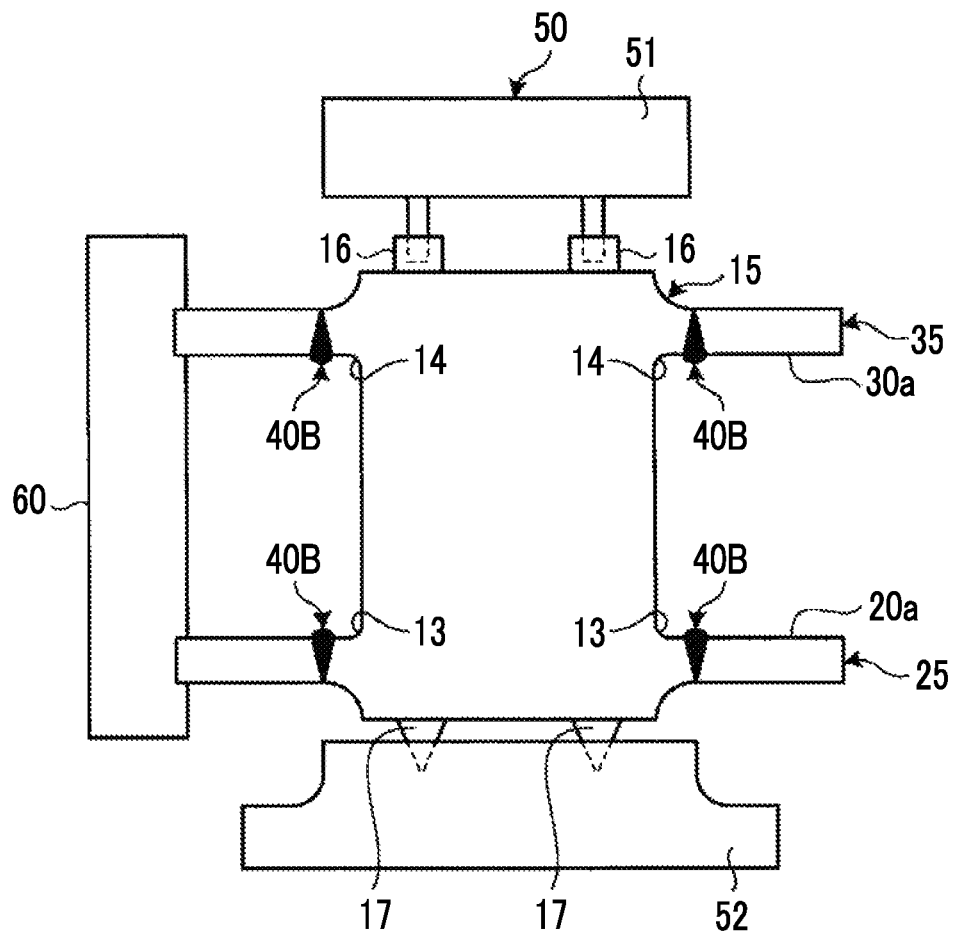
FIG. 12 is a process diagram showing a state where the blade body is joined to the inner shroud and the outer shroud.

After the alignment between the blade body divided body 15 and the joined bodies 25 and 35 is performed, the blade body divided body joining step ST43 is performed. FIG. 12 is a diagram showing an example of the blade body divided body joining step ST43. In the blade body divided body joining step ST43, the blade body divided body 15 and the joined bodies 25 and 35 are welded to each other by, for example, a laser powder overlay welding method. As the powder which is used for the welding, for example, powder of the same material as the blade body 10, the inner shroud 20, and the outer shroud 30, that is, powder of the same material as the blade body constituent material and the shroud constituent material can be used. In this way, a configuration is made in which strength in a welded portion is excellent. Further, since low heat input welding is made, deformation due to welding can be suppressed. In this step, the blade body divided body 15 and the joined bodies 25 and 35 are welded to each other at positions avoiding the fillet portions 13 and 14.

By performing the above welding, for example, as shown in FIG. 12, welded portions 40B are formed between the blade body divided body 15 and the joined bodies 25 and 35. After the welded portions 40B are formed, the first jig 50 is removed from the blade body divided body 15 and the second jig 60 is removed from the joined bodies 25 and 35.

Figure 13:
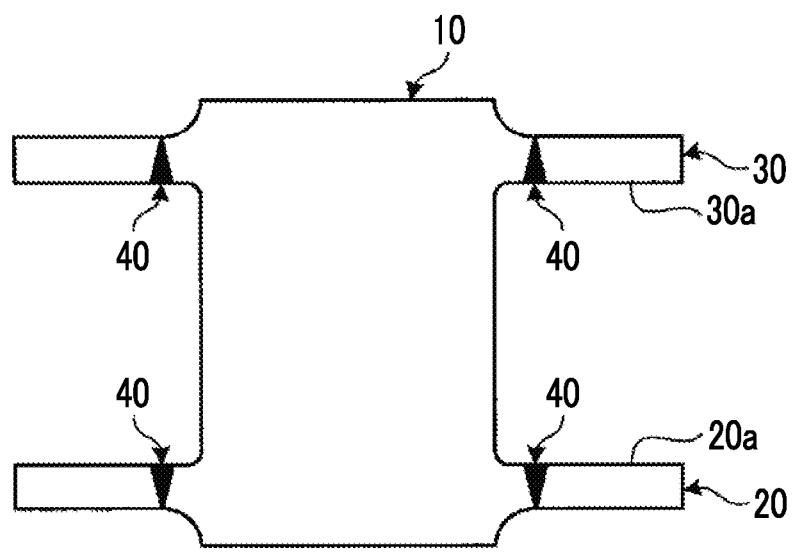
FIG. 13 is a process diagram showing a state where the blade body is joined to the inner shroud and the outer shroud.

By performing the laser powder overlay welding method, there is a case where a state where the welded portion 40B protrudes from each of the gas path surfaces 20a and 30a is created. In this case, as shown in FIG. 13, for example, the bulge of the surface of the welded portion 40B is removed such that the surface of the welded portion 40B is in a state of being flush with the gas path surfaces 20a and 30a. In this way, the turbine blade 100 which includes the blade body 10, the inner shroud 20, and the outer shroud 30 is obtained. In the blade body joining step ST40, it is not limited to an aspect in which the blade body divided body 15 and the joined bodies 25 and 35 are joined to each other, and for example, an aspect may be adopted in which the shroud divided bodies 41, 42, and 43 are individually joined to the blade body divided body 15.

As described above, the method of manufacturing a turbine blade according to this embodiment includes the blade body divided body formation step ST10 of forming the blade body divided body 15 constituting the blade body 10 of the turbine blade 100 by a three-dimensional lamination method, the shroud divided body formation step ST20 of forming the plurality of shroud divided bodies 41, 42, and 43 constituting at least one of the inner shroud 20 and the outer shroud 30 of the turbine blade 100 individually for each of the shroud divided bodies 41, 42, and 43 by a three-dimensional lamination method, the shroud joining step ST30 of joining the shroud divided bodies 41, 42, and 43 together, and the blade body joining step ST40 of joining the blade body divided body 15 and the shroud divided bodies 41, 42, and 43.

Therefore, since each part is separately formed by a three-dimensional lamination method, the amount of the used support material can be greatly reduced compared to a case where the blade body and the shroud are formed together by a three-dimensional lamination method. For this reason, time and labor which are required for the lamination step can be reduced, and time and labor which are required for the post-treatment of the support can also be reduced. In this way, the turbine blade 100 can be manufactured more efficiently.

Further, in the method of manufacturing a turbine blade according to this embodiment, in the shroud divided body formation step ST20, the shroud divided bodies 41, 42, and 43 are formed by performing lamination in a direction different from the direction in which the blade body divided body 15 is laminated in the blade body divided body formation step ST10. Therefore, each of the blade body divided body 15 and the shroud divided bodies 41, 42, and 43 can be formed by being laminated in an appropriate direction.

In the method of manufacturing a turbine blade according to this embodiment, the extension direction De of the blade body 10, and the extension direction Df of the inner shroud 20 and the extension direction Dg of the outer shroud 30, which are directions each having an angle with respect to the extension direction De of the blade body 10, are set in the turbine blade 100, in the blade body divided body formation step ST10, the blade body divided body 15 may be formed by performing lamination along the extension direction De of the blade body 10, and in the shroud divided body formation step ST20, the shroud divided bodies 41, 42, and 43 may be formed by performing lamination along the extension direction Df of the inner shroud 20 and the extension direction Dg of the outer shroud 30. Therefore, the blade body divided body 15 can be laminated along the extension direction De of the blade body 10, and the shroud divided bodies 41, 42, and 43 can be laminated along the extension direction Df of the inner shroud 20 and the extension direction Dg of the outer shroud 30. In this way, a lamination area is small, and therefore, the lamination can be performed in a narrow work space.

Further, in the method of manufacturing a turbine blade according to this embodiment, in the shroud divided body formation step ST20, when the cooling flow paths 45 and 46 in which the cross-sectional shape of the flow path is a shape having the long-side direction D1 and the short-side direction Ds are formed in the interior of at least one shroud divided body among the plurality of shroud divided bodies 41, 42, and 43, the shroud divided bodies 41, 42, and 43 are formed by performing lamination in the long-side direction D1 of the cross-sectional shapes of the cooling flow paths 45 and 46. According to this configuration, the shroud divided bodies 41, 42, and 43 are formed by performing lamination in the long-side direction of the cross-sectional shapes of the cooling flow paths 45 and 46, whereby the use of the support material can be suppressed, and therefore, the turbine blade 100 can be manufactured more efficiently.

Further, in the method of manufacturing a turbine blade according to this embodiment, in the shroud divided body formation step, the shroud divided bodies 41, 42, and 43 are formed in such a size that a cooling flow path unit which is configured with the continuous cooling flow paths 45 and 46 does not straddle the joined portions 44 between the shroud divided bodies 41, 42, and 43. According to this configuration, the shroud divided bodies 41, 42, and 43 can be manufactured more efficiently.

Further, in the method of manufacturing a turbine blade according to this embodiment, in the shroud divided body formation step ST20, the shroud divided bodies 41, 42, and 43 may be formed such that the joined portion 44 between the shroud divided bodies 41, 42, and 43 is provided at a position where the distance between the blade body 10 and the end surface 30c in the extension directions Df and Dg of the shrouds is reduced. Therefore, with respect to the joined portions joining the shroud divided bodies 41, 42, and 43 to each other, the distance can be kept small.

Further, in the method of manufacturing a turbine blade according to this embodiment, the fillet portions 13 and 14 of the blade body 10 may be provided in the blade body divided body 15, and the blade body joining step ST40 may include joining the blade body divided body 15 and the shroud divided bodies 41, 42, and 43 at positions avoiding the fillet portions 13 and 14. In this case, it is possible to efficiently manufacture the turbine blade 100 while maintaining the quality thereof.

Further, in the method of manufacturing a turbine blade according to this embodiment, the shroud joining step ST30 and the blade body joining step ST40 may include welding the divided bodies (15, 41, 42, 43) to each other by a laser powder overlay welding method. In this case, since the divided bodies (15, 41, 42, 43) can be efficiently and strongly joined to each other, the turbine blade 100 having excellent strength can be efficiently manufactured.

Further, in the method of manufacturing a turbine blade according to this embodiment, the inner shroud 20 and the outer shroud 30 may have the gas path surfaces 20a and 30a facing the blade body 10 side, and the joining step may include providing the joining grooves 18 and 48 on the gas path surfaces 20a and 30a and welding the blade body divided body 15 and the plurality of shroud divided bodies 41, 42, and 43 or the joined bodies 25 and 35. In this case, since it is possible to avoid the back wave of the welded portion being formed on the side of the gas path surfaces 20a and 30a, a decrease in quality can be suppressed.

Further, in the method of manufacturing a turbine blade according to this embodiment, in the welding by the laser powder overlay welding method, the welding may be performed using powder of the same material as the blade body constituent material constituting the blade body 10 and the shroud constituent material constituting the shrouds (20, 30). Therefore, since the blade body 10 and the shrouds (20, 30), and the welded portion are formed of the same material, a configuration is made in which strength in the welded portion is excellent.

Further, in the method of manufacturing a turbine blade according to this embodiment, the blade body divided body formation step ST10 may include forming the positioning portions 16 and 17 at the blade body divided body 15, and the blade body joining step ST40 may include fixing the positioning portions 16 and 17 of the blade body divided body 15 to the first jig 50 and fixing the joined bodies 25 and 35 to the second jig 60, aligning the blade body divided body 15 fixed to the first jig 50 with the joined bodies 25 and 35 fixed to the second jig 60, and joining the blade body divided body 15 and the joined bodies 25 and 35 aligned. In this case, by forming the positioning portions 16 and 17 at the blade body divided body 15, the first jig 50 can be easily mounted to the blade body divided body 15. Further, by fixing and joining the blade body divided body 15 and the joined bodies 25 and 35 to each other by using the first jig 50 and the second jig 60, misalignment when performing the joining can be suppressed, and the turbine blade 100 can be efficiently manufactured with high accuracy. The positioning portions 16 and 17 can be removed after the blade body divided body 15 and the joined bodies 25 and 35 of the shrouds are joined to each other.

The turbine blade 100 according to another embodiment of the present invention includes the blade body 10 in which the blade body constituent materials 19 are laminated in one direction, and the inner shroud 20 and the outer shroud 30 which are joined to the blade body 10, in which in at least one of the inner shroud 20 and the outer shroud 30, the plurality of shroud divided bodies 41, 42, and 43 in a state where the shroud constituent materials 49 are laminated on one direction are joined together. In this case, it is possible to provide the turbine blade 100 in which manufacturing efficiency is high and a reduction in cost is possible.

The turbine blade according to another embodiment of the present invention includes the blade body 10 in which the blade body constituent materials 19 are laminated, and the inner shroud 20 and the outer shroud 30 joined to the blade body 10, in which a lamination direction in a three-dimensional lamination method is different between the blade body 10, and the inner shroud 20 and the outer shroud 30. Therefore, each of the blade body divided body 15 and the shroud divided bodies 41, 42, and 43 can be formed by being laminated in an appropriate direction.

Further, in the turbine blade 100 according to another embodiment of the present invention, the extension direction De of the blade body 10 and the extension direction Df of the inner shroud 20 and the extension direction Dg of the outer shroud 30, which are directions each having an angle with respect to the extension direction De of the blade body 10, are set, the lamination direction of the blade body 10 may be a direction along the extension direction De of the blade body 10, the lamination direction of the inner shroud 20 may be a direction along the extension direction Df of the inner shroud, and the lamination direction of the outer shroud 20 may be a direction along the extension direction Dg of the outer shroud. Therefore, with respect to the blade body divided body 15, lamination can be performed along the extension direction De of the blade body 10, and with respect to the shroud divided bodies 41, 42, and 43, lamination can be performed along the extension directions of the inner shroud 20 and the outer shroud 30.

Further, in the turbine blade 100 according to another embodiment of the present invention, the inner shroud 20 and the outer shroud 30 have, in the interior thereof, the cooling flow paths 45 and 46, in each of which a cross-sectional shape is a shape having a long-side direction and a short-side direction, and the lamination direction of each of the inner shroud 20 and the outer shroud 30 is a direction along the long-side direction of the cross-sectional shape of each of the cooling flow paths 45 and 46. Therefore, the shroud divided bodies 41, 42, and 43 can be formed by performing lamination in the long-side direction of the cross-sectional shape of each of the cooling flow paths 45 and 46. In this way, since the use of the support material can be suppressed, the turbine blade can be manufactured more efficiently and at low cost.

The technical scope of the present invention is not limited to the embodiments described above, and appropriate modifications can be made within a scope which does not depart from the gist of the present invention.

For example, in the embodiment described above, a case where the shroud divided bodies 41, 42, and 43 are formed with respect to both the inner shroud 20 and the outer shroud 30 has been described as an example. However, there is no limitation thereto. For example, the shroud which is formed below the blade body 10 in the lamination direction may be formed integrally with the blade body 10 by a three-dimensional lamination method. In this case, it is favorable if the shroud divided bodies 41, 42, and 43 are formed with respect to the shroud which is disposed above the blade body 10 in the lamination direction. That is, an aspect may be adopted in which the shroud divided bodies 41, 42, and 43 are formed with respect to only one of the inner shroud 20 and the outer shroud 30. Even in such an aspect, time and labor which are required for a post-treatment step of dissolving the support material can be reduced.

Figure 14:
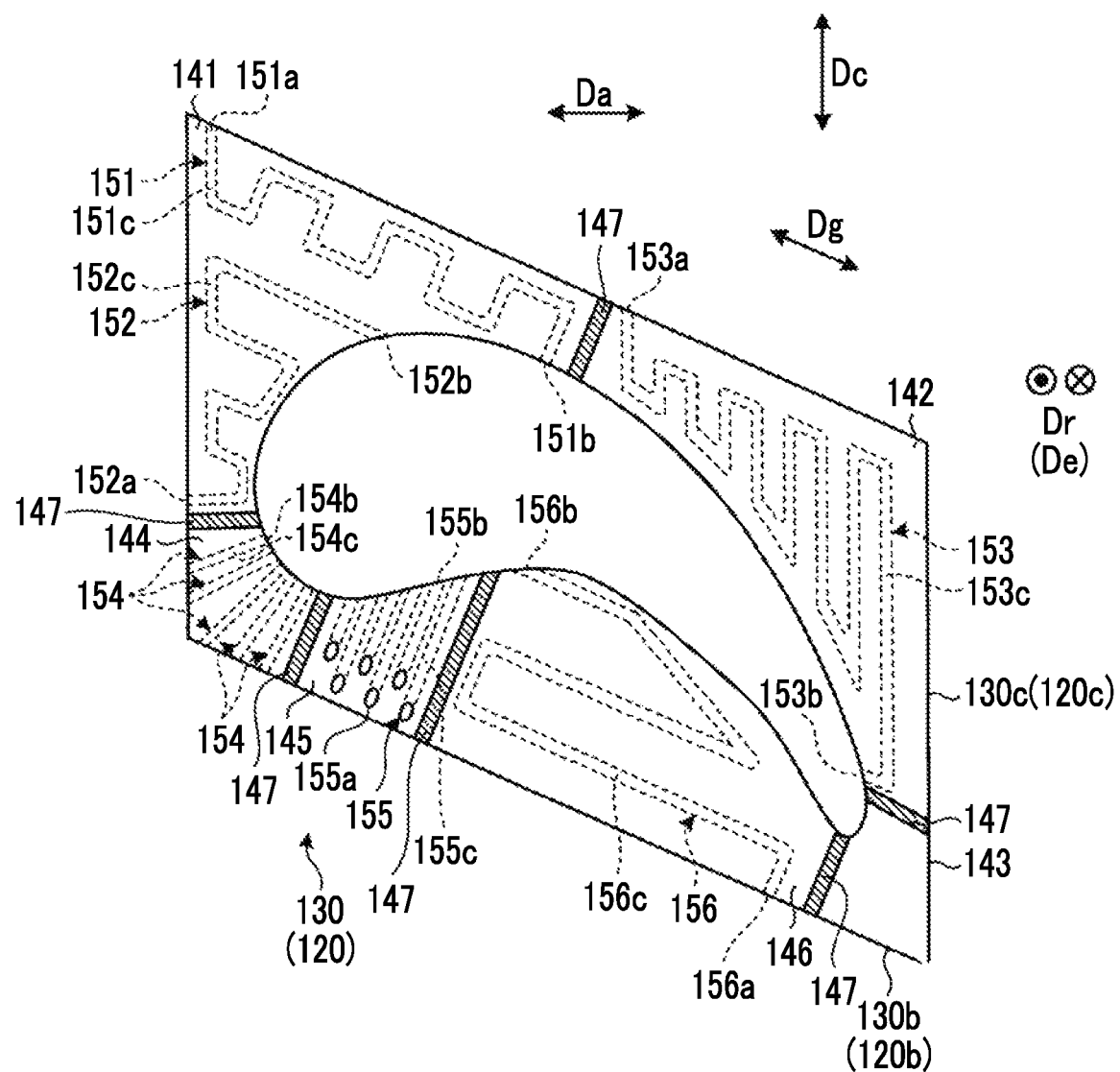
FIG. 14 is a diagram showing an example of an inner shroud and an outer shroud according to a modification example.

FIG. 14 is a diagram showing an example of an outer shroud 130 according to a modification example. As shown in FIG. 14, the outer shroud 130 has a configuration in which a plurality of shroud divided bodies 141, 142, 143, 144, 145, and 146 are joined at joined portions 147. The joined portion 147 is a welded portion by, for example, a laser powder overlay welding method. Each of the shroud divided bodies 141, 142, 143, 144, 145, and 146 is formed in a state where the shroud constituent materials are laminated in one direction. The lamination direction of the shroud constituent materials may be a direction different for each of the shroud divided bodies 141, 142, 143, 144, 145, and 146 in one outer shroud 30, for example.

The shroud divided body 141 has independent and different cooling flow paths 151 and 152. In this manner, a configuration may be adopted in which, for example, one shroud divided body 141 has a plurality of independent and different cooling flow paths. The shroud divided body 142 has a cooling flow path 153. The shroud divided body 143 is not provided with a cooling flow path. In this manner, the shroud divided body 143 in which a cooling flow path is not provided may be disposed. The shroud divided body 144 has a purge flow path 154. The shroud divided body 145 has a cooling flow path 155. The shroud divided body 146 has a cooling flow path 156. The cooling flow paths 151, 152, 153, and 156 configure a part of a cooling flow path for supplying cooling air from, for example, the end surface 30b (or the end surface 30c) of the outer shroud to the inner shroud 20 through the interior of the blade body 10. The cooling flow paths 151, 152, 153, and 156 respectively have outer periphery side opening portions 151a, 152a, 153a, and 156a, inner periphery side opening portions 151b, 152b, 153b, and 156b, and flow path portions 151c, 152c, 153c, and 156c.

Further, the purge flow path 154 has an outer periphery side opening portion, an inner periphery side opening portion 154b, and a flow path portion 154c. In this manner, a configuration may be adopted in which the purge flow path 154 is provided in the shroud divided body 144.

Further, the cooling flow path 155 has an opening portion 155a disposed on the gas path surface of, for example, the outer shroud 130, an inner periphery side opening portion 155b, and a flow path portion 155c. In this manner, a configuration may be adopted in which the opening portion 155a on one side is disposed on the gas path surface of the outer shroud 130.

In the embodiment described above, an example has been described in which in the shroud joining step and the blade body joining step of the method of manufacturing a turbine blade, the divided bodies are welded to each other by a laser powder overlay welding method. However, the welding method is not limited thereto. For example, the method of manufacturing a turbine blade may include an aspect in which welding is performed using other various welding methods (for example, TIG welding or the like) instead of the laser powder overlay welding method. Further, in the turbine blade, a turbine blade which includes a welded portion joined by other various welding methods (for example, TIG welding or the like) instead of the laser powder overlay welding method may be adopted.

Further, in each of the embodiments described above, as cooling flow path provided in the interior of the shroud, the cooling flow path of which a cross-sectional shape is a shape having a long-side direction and a short-side direction is shown. However, the cross-sectional shape of the cooling flow path is not limited thereto. For example, the cross-sectional shape of the cooling flow path may include a circle or a square, and a cooling flow path having a different cross-sectional shape in the interior thereof may be adopted.

In addition, in the shroud joining step and the blade body joining step in each of the embodiments described above, the order of joining the shroud divided bodies together, the order of joining the joined body of the shroud divided bodies and the blade body divided body, and the order of joining the shroud divided body and the blade body divided body are not limited to the examples shown in each of the embodiments described above. With respect to these joining orders, it is favorable if joining is performed in the optimal orders for joining, and an aspect in which some or all of these joining are performed at the same time may be adopted.

Figure 15:
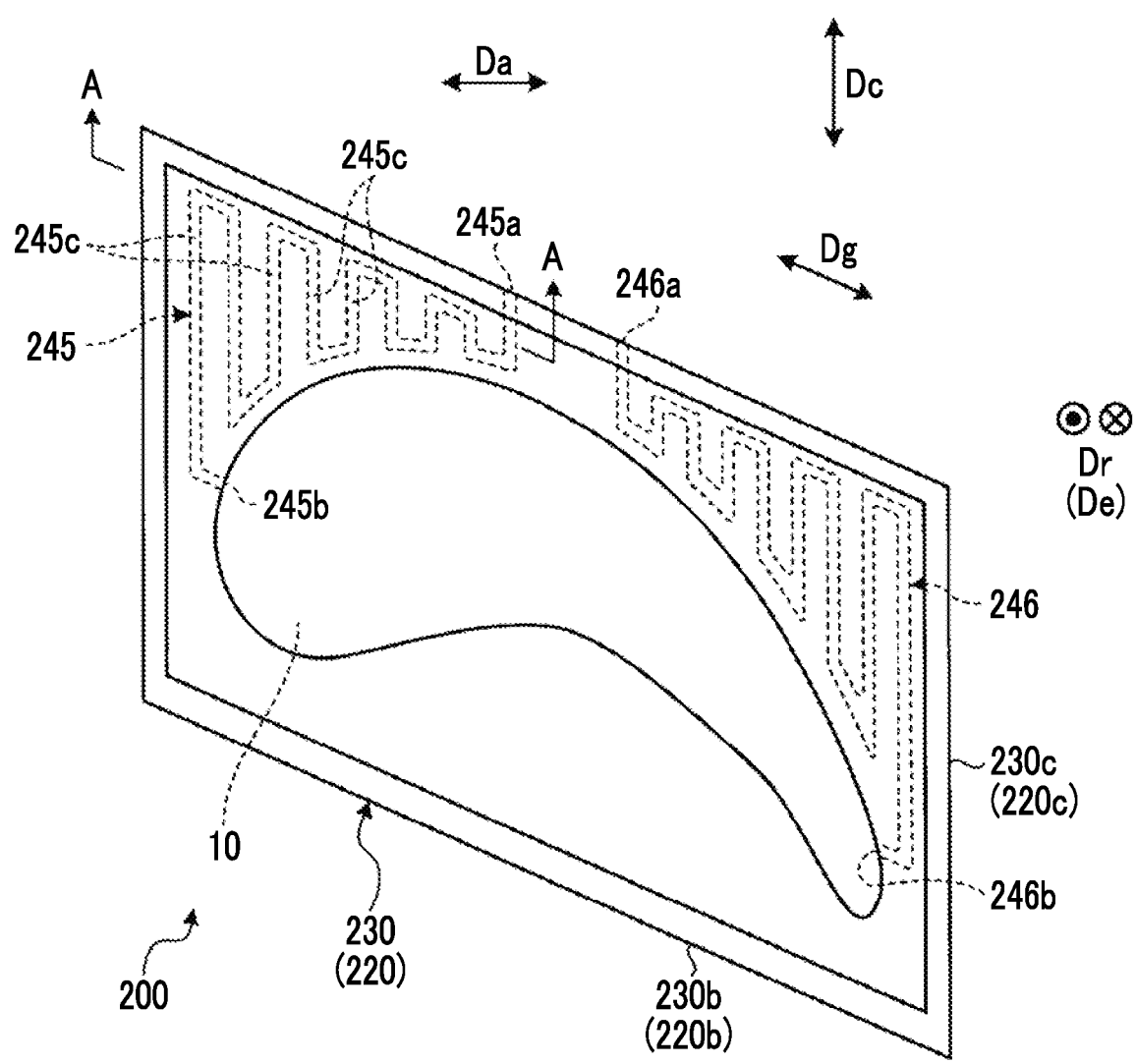
FIG. 15 is a diagram showing an example of an outer shroud in a turbine blade according to a modification example.

FIG. 15 is a diagram showing an example of an outer shroud 230 in a turbine blade 200 according to a modification example. The outer shroud 230 shown in FIG. 15 does not have a configuration in which a plurality of shroud divided bodies as described above are joined together but has an integrated configuration which does not include divided bodies. The outer shroud 230 is formed in a state where shroud constituent materials are laminated in one direction by, for example, a three-dimensional lamination method. The outer shroud 230 is formed separately from the blade body 10 and is joined to the blade body 10. The lamination direction in the three-dimensional lamination method is a difference between the outer shroud 230 and the blade body 10.

The other configurations of the outer shroud 230 can be the same configurations as, for example, the outer shroud 30 of the embodiment described above. Therefore, the outer shroud 230 has, in the interior thereof, cooling flow paths 245 and 246 through which cooling air flows, similar to the outer shroud 30. The cooling flow paths 245 and 246 have the same configurations as the cooling flow paths 45 and 46 of the embodiment described above. That is, the cooling flow paths 245 and 246 configure a part of a cooling flow path for supplying cooling air from the interior of the blade body 10 to an end surface 230b (or an end surface 230c) of the outer shroud 230. Each of the cooling flow paths 245 and 246 is formed as an independent flow path. Further, the cooling flow path 245 has an outer periphery side opening portion 245a and an inner periphery side opening portion 245b. The cooling flow path 246 has an outer periphery side opening portion 246a and an inner periphery side opening portion 246b. In the cooling flow paths 245 and 246, the cross-sectional shapes of flow path portions 245c are elongated hole shapes.

In this manner, the turbine blade 200 has a configuration in which the outer shroud 230 and the blade body 10 are separately formed in a state where the lamination directions are different from each other by a three-dimensional lamination method and the outer shroud 230 and the blade body 10 are joined to each other. Therefore, when the outer shroud 230 is laminated by the three-dimensional lamination method, it is not necessary to support a portion protruding from the blade body 10 with a support material or the like, and therefore, the use of the support material can be suppressed.

REFERENCE SIGNS LIST

10: blade body
13, 14: fillet portion
15: blade body divided body
16, 17: positioning portion
16a: recessed portion
18, 48: joining groove
18a, 48a: hook portion
19: blade body constituent material
20: inner shroud
20a, 30a: gas path surface
25, 35: joined body
30, 130, 230: outer shroud
40, 44, 147: joined portion
40B: welded portion
41, 42, 43, 141, 142, 143, 144, 145, 146: shroud divided body
44A, 44B, 44C: joined portion
45, 46, 245, 246: cooling flow path
45a, 46a, 245a, 246a: outer periphery side opening portion
45b, 46b, 245b, 246b: inner periphery side opening portion
45c, 46c, 245c, 246c: flow path portion
49: shroud constituent material
50: first jig
51, 52: support member
51a: protrusion portion
52a: insertion hole
60: second jig
100, 200: turbine blade
Da: axial direction
Dc: circumferential direction
Dr: radial direction
De: extension direction of blade body
Df: extension direction of inner shroud
Dg: extension direction of outer shroud
ST10: blade body divided body formation step ST20: shroud divided body formation step
ST30: shroud joining step
ST40: blade body joining step

The invention claimed is:

1. A method of manufacturing a stationary turbine blade, the method comprising:
three-dimensionally laminating blade body constituent material so as to form a blade divided body constituting a blade body of the stationary turbine blade;
three-dimensionally laminating each of a plurality of shroud divided bodies constituting a shroud of the stationary turbine blade;
joining the plurality of shroud divided bodies together by welding; and
joining the blade body and the plurality of shroud divided bodies,
wherein:
a lamination direction of the blade body is different from a lamination direction of the shroud;
at least one of the plurality of shroud divided bodies has, in an interior thereof, a cooling flow path with a cross-sectional shape having a long-side direction and a short-side direction; and
a lamination direction of the at least one of the plurality of shroud divided bodies is a direction along the long-side direction of the cross-sectional shape of the cooling flow path, and the cross-sectional shape is perpendicular to a flow direction of cooling air in the cooling flow path.

2. The method according to claim 1,
wherein an extension direction of the blade body and an extension direction of the shroud are set in the stationary turbine blade,
wherein the extension direction of the shroud is at a direction having an angle with respect to the extension direction of the blade body,
wherein three-dimensionally laminating the blade body constituent material so as to form the blade divided body includes performing lamination along the extension direction of the blade body, and
wherein three-dimensionally laminating each of the plurality of shroud divided bodies includes performing lamination along the extension direction of the shroud.

3. The method according to claim 1, wherein three-dimensionally laminating each of the plurality of shroud divided bodies includes performing lamination in the long-side direction of the cross-sectional shape of the cooling flow path.

4. The method according to claim 1, wherein three-dimensionally laminating each of the plurality of shroud divided bodies includes forming the plurality of shroud divided bodies such that a joined portion between the plurality of shroud divided bodies is provided at a position where a distance between the blade body and an end surface in an extension direction of the shroud is reduced.

5. The method according to claim 1,
wherein a fillet portion is provided in the blade body, and
wherein joining the blade body and the plurality of shroud divided bodies includes joining the blade body and the plurality of shroud divided bodies at a position avoiding the fillet portion.

6. The method according to claim 1,
wherein joining the plurality of shroud divided bodies together by welding includes laser powder overlay welding, and
wherein joining the blade body and the plurality of shroud divided bodies includes welding the blade body and the plurality of shroud divided bodies to each other by laser powder overlay welding.

7. The method according to claim 6, wherein the laser powder overlay welding is performed using powder of the same material as the blade body constituent material and of the same material as a shroud constituent material constituting the shroud.

8. The method according to claim 6,
wherein the shroud has a gas path surface facing a blade body side, and
wherein joining the blade body and the plurality of shroud divided bodies includes providing a joining groove on a gas path surface side.

9. The method according to claim 1,
wherein three-dimensionally laminating the blade body constituent material so as to form the blade divided body includes three-dimensionally laminating a positioning portion at the blade divided body, and
wherein joining the blade body and the plurality of shroud divided bodies includes:
fixing the positioning portion of the blade divided body to a first jig and fixing the plurality of shroud divided bodies to a second jig;
aligning the blade divided body fixed to the first jig with the plurality of shroud divided bodies fixed to the second jig; and
joining the blade body and the plurality of shroud divided bodies while aligned.

10. A stationary turbine blade comprising:
a blade body in which blade body constituent material is laminated three-dimensionally; and
a shroud laminated three-dimensionally, formed separately from the blade body and joined to the blade body,
wherein:
a lamination direction of the blade body is different from a lamination direction of the shroud;
the shroud includes a plurality of shroud divided bodies joined together by welding;
at least one of the plurality of shroud divided bodies has, in an interior thereof, a cooling flow path with a cross-sectional shape having a long-side direction and a short-side direction; and
a lamination direction of the at least one of the plurality of shroud divided bodies is a direction along the long-side direction of the cross-sectional shape of the cooling flow path, and the cross-sectional shape is perpendicular to a flow direction of cooling air in the cooling flow path.

11. The stationary turbine blade according to claim 10, wherein:
an extension direction of the blade body and an extension direction of the shroud are set in the stationary turbine blade;
the extension direction of the shroud is at a direction having an angle with respect to the extension direction of the blade body;
the lamination direction of the blade body is a direction along the extension direction of the blade body; and
the lamination direction of the shroud is a direction along the extension direction of the shroud.

12. The stationary turbine blade according to claim 10, wherein:
the blade body includes a fillet portion;
the blade body and the shroud are joined to each other by a joined portion; and the joined portion is formed at a position outside the fillet portion.

13. The stationary turbine blade according to claim 12, wherein:
the shroud has a gas path surface facing a blade body side; and
the joined portion is flush with the gas path surface.

* * * * *